(12) United States Patent
Wilson-Thomas et al.

(10) Patent No.: US 11,074,048 B1
(45) Date of Patent: Jul. 27, 2021

(54) AUTOSYNTHESIZED SUBLANGUAGE SNIPPET PRESENTATION

(71) Applicant: Microsoft Technology Licensing, LLC, Redmond, WA (US)

(72) Inventors: Mark Alistair Wilson-Thomas, Mercer Island, WA (US); Ivan Radicek, Vienna (AT); Arjun Radhakrishna, Seattle, WA (US); Ashish Tiwari, Sammamish, WA (US); Sumit Gulwani, Sammamish, WA (US); Titus Barik, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/860,535

(22) Filed: Apr. 28, 2020

(51) Int. Cl.
*G06F 9/44* (2018.01)
*G06F 8/33* (2018.01)
*G06F 8/34* (2018.01)

(52) U.S. Cl.
CPC . *G06F 8/33* (2013.01); *G06F 8/34* (2013.01)

(58) Field of Classification Search
None
See application file for complete search history.

(56) References Cited

U.S. PATENT DOCUMENTS

| 8,566,789 | B2 | 10/2013 | Siddarammappa et al. |
| 2005/0166193 | A1 | 7/2005 | Smith et al. |
| 2007/0299793 | A1 | 12/2007 | Musuvathi et al. |
| 2008/0172650 | A1 | 7/2008 | Gulwani et al. |
| 2008/0276025 | A1 | 11/2008 | Cherem et al. |
| 2008/0282108 | A1 | 11/2008 | Jojic et al. |

(Continued)

OTHER PUBLICATIONS

Bartoli, et al., "Automatic Synthesis of Regular Expressions from Examples", Retrieved From: https://arts.units.it/retrieve/handle/11368/2758954/57751/2014-Computer-AutomaticSynthesisRegexExamples%20(2).pdf, Jul. 5, 2013, 16 Pages.

(Continued)

*Primary Examiner* — Anna C Deng
(74) *Attorney, Agent, or Firm* — Ogilvie Law Firm

(57) ABSTRACT

In a computer program, sublanguage code snippets implement regular expressions, pattern matching, print formatting, component selection, and other operations, using sublanguage syntax and semantics different from the source code in which snippets are embedded. Writing snippets that give desired execution results has been difficult and interfered with software development workflow. But sublanguage snippet presentation functionality in an enhanced development tool automatically detects source code locations suitable for snippets, receives snippet execution result examples from a developer, submits the examples to synthesis-by-example technology, gets autosynthesized snippets that give those results, and displays snippet insertion candidates with guidance. A snippet selected by the developer replaces the example(s) in the source code, improving developer productivity and program execution accuracy with respect to documented test cases. Examples may be autogenerated, including representative examples or disambiguating examples. Examples may be preserved in comments. Performance criteria for sublanguage snippet presentation are also described.

20 Claims, 4 Drawing Sheets

(56) References Cited

U.S. PATENT DOCUMENTS

| | | | |
|---|---|---|---|
| 2008/0301655 | A1 | 12/2008 | Gulwani et al. |
| 2009/0276763 | A1 | 11/2009 | Gulwani et al. |
| 2009/0326907 | A1 | 12/2009 | Gulwani et al. |
| 2009/0327997 | A1 | 12/2009 | Gulwani et al. |
| 2010/0088548 | A1 | 4/2010 | Gulwani et al. |
| 2010/0088684 | A1 | 4/2010 | Gulwani et al. |
| 2010/0318980 | A1 | 12/2010 | Gulwani et al. |
| 2011/0078665 | A1 | 3/2011 | Gulwani et al. |
| 2011/0225572 | A1 | 9/2011 | Stoicescu et al. |
| 2011/0302553 | A1 | 12/2011 | Gulwani et al. |
| 2012/0011084 | A1 | 1/2012 | Gulwani et al. |
| 2012/0011152 | A1 | 1/2012 | Gulwani et al. |
| 2012/0192051 | A1 | 7/2012 | Rothschiller et al. |
| 2012/0197829 | A1 | 8/2012 | Nori et al. |
| 2012/0198322 | A1 | 8/2012 | Gulwani et al. |
| 2013/0144902 | A1* | 6/2013 | Gulwani ............... G06F 40/18 707/769 |
| 2013/0188877 | A1 | 7/2013 | Gulwani et al. |
| 2013/0275847 | A1 | 10/2013 | Gulwani et al. |
| 2013/0326475 | A1 | 12/2013 | Gulwani et al. |
| 2013/0346982 | A1 | 12/2013 | Kalai et al. |
| 2014/0013299 | A1* | 1/2014 | Bordeaux ............... G06F 8/30 717/106 |
| 2014/0059078 | A1 | 2/2014 | Gulwani et al. |
| 2014/0108305 | A1 | 4/2014 | Gulwani et al. |
| 2014/0214399 | A1 | 7/2014 | Gulwani et al. |
| 2014/0236554 | A1* | 8/2014 | Wang ............... G06N 5/00 703/6 |
| 2014/0236991 | A1 | 8/2014 | Gulwani et al. |
| 2014/0282375 | A1 | 9/2014 | Gulwani et al. |
| 2015/0019216 | A1 | 1/2015 | Singh et al. |
| 2015/0089297 | A1 | 3/2015 | Johnson et al. |
| 2015/0095312 | A1 | 4/2015 | Gulwani et al. |
| 2015/0254211 | A1 | 9/2015 | Gulwani et al. |
| 2015/0254353 | A1 | 9/2015 | Gulwani et al. |
| 2015/0254530 | A1 | 9/2015 | Gulwani et al. |
| 2015/0331416 | A1 | 11/2015 | Feniello et al. |
| 2016/0103662 | A1 | 4/2016 | Di balsamo et al. |
| 2016/0299744 | A1 | 10/2016 | Kalai et al. |
| 2016/0314408 | A1 | 10/2016 | Gulwani et al. |
| 2016/0350276 | A1 | 12/2016 | Gulwani et al. |
| 2017/0075661 | A1 | 3/2017 | Gulwani et al. |
| 2017/0091589 | A1 | 3/2017 | Gulwani et al. |
| 2017/0212829 | A1 | 7/2017 | Bales et al. |
| 2017/0220673 | A1 | 8/2017 | Gulwani et al. |
| 2018/0039693 | A1 | 2/2018 | Singh et al. |
| 2018/0107724 | A1 | 4/2018 | Ganjam et al. |
| 2018/0113848 | A1 | 4/2018 | Gulwani et al. |
| 2018/0113873 | A1 | 4/2018 | Gulwani et al. |
| 2018/0113887 | A1 | 4/2018 | Le et al. |
| 2018/0113890 | A1 | 4/2018 | Raza et al. |
| 2018/0113894 | A1 | 4/2018 | Raza et al. |
| 2018/0113906 | A1 | 4/2018 | Gulwani et al. |
| 2018/0113907 | A1 | 4/2018 | Gulwani et al. |
| 2018/0113922 | A1 | 4/2018 | Gulwani et al. |
| 2018/0121525 | A1 | 5/2018 | Simmons et al. |
| 2018/0150500 | A1 | 5/2018 | Le et al. |
| 2018/0150554 | A1 | 5/2018 | Le et al. |
| 2018/0188897 | A1 | 7/2018 | Gulwani et al. |
| 2018/0246915 | A1 | 8/2018 | Singh et al. |
| 2019/0034437 | A1 | 1/2019 | Gulwani et al. |
| 2019/0102438 | A1 | 4/2019 | Murray et al. |
| 2019/0171422 | A1 | 6/2019 | Udupa et al. |
| 2019/0212989 | A1 | 7/2019 | Polozov et al. |
| 2019/0235842 | A1 | 8/2019 | Raza et al. |
| 2019/0311004 | A1 | 10/2019 | Gulwani et al. |
| 2019/0311022 | A1* | 10/2019 | Fan ............... G06F 40/166 |
| 2019/0324730 | A1* | 10/2019 | Gulwani ............... G06F 8/30 |
| 2019/0332704 | A1* | 10/2019 | Gulwani ............... G06N 3/08 |
| 2019/0347267 | A1 | 11/2019 | Le et al. |
| 2019/0384763 | A1 | 12/2019 | Malak et al. |
| 2019/0384851 | A1 | 12/2019 | Le et al. |

OTHER PUBLICATIONS

"EditPad Lite: Basic Text Editor with Full Regular Expression Support", Retrieved From: https://www.regular-expressions.info/editpadlite.html, Mar. 20, 2020, 2 Pages.

"FIDEX: Filtering Spreadsheet Data using Examples", Retrieved From: https://www.youtube.com/watch?v=4-AjWkRGHC4, 2016, 1 Page.

"Structural Search and Replace", Retrieved From: https://www.jetbrains.com/help/idea/structural-search-and-replace.html, Dec. 9, 2019, 9 Pages.

"What is $1 and $2 in Regular Expressions?", Retrieved From: https://stackoverflow.com/questions/19141069/what-is-1-and-2-in-regular-expressions, Oct. 2, 2013, 3 Pages.

Bartoli, et al., "Inference of Regular Expressions for Text Extraction from Examples", In Journal of IEEE Transactions on Knowledge and Data Engineering, vol. 28, Issue: 5, Jan. 7, 2016, pp. 1217-1230.

Brazma, Alvis, "Efficient Identification of Regular Expressions from Representative Examples", In Proceedings of the Sixth Annual Conference on Computational Learning Theory, Aug. 1, 1993, pp. 236-242.

Cai, et al., "A Pattern-Based Code Transformation Approach for Cloud Application Migration", In Proceedings of IEEE 8th International Conference on Cloud Computing, Jun. 27, 2015, pp. 33-40.

Padhi, et al., "FlashProfile: A Framework for Synthesizing Data Profiles", Retrieved From: https://www.microsoft.com/en-us/research/publication/flashprofile-a-framework-for-synthesizing-data-profiles/, Nov. 1, 2018, 2 Pages.

Padhi, et al., "FlashProfile: A Framework for Synthesizing Data Profiles", In Proceedings of the ACM on Programming Languages, No. 2, Oct. 24, 2018, 28 Pages.

Wang, et al., "FIDEX: Filtering Spreadsheet Data using Examples", In Proceedings of the 16th ACM SIGPLAN Conference on Object-Oriented Programming, Systems, Languages, and Applications, Oct. 19, 2016, pp. 195-213.

David Ramel, "Microsoft Boosts Al-Assisted Developer Productivity", retrieved from <<https://visualstudiomagazine.com/articles/2019/11/05/ai-tooling.aspx>>, Nov. 5, 2019, 7 pages.

Risabh Sing, et al., "Transformin g Spreadsheet Data Types Using Examples", retrieved from >>http://people.csail.mit.edu/rishabh/papers/popl16-semantic.pdf>>, 2016, 14 pages.

Risabh Sing, et al., "Synthesizing Number Transformations from Input-Output Examples", retrieved from <<https://www.microsoft.com/en-us/research/wp-content/uploads/2016/06/cav12-1-1.pdf>>, 2016, 18 pages.

Risabh Sing, et al., "Learning Semantic String Transformations from Examples", retrieved from <<http://vldb.org/pvldb/vol5/p740_rishabhsingh_vldb2012.pdf>>, 2012, 12 pages.

Lars Vogel, "Regular expressions in Java—Tutorial", retrieved from <<https://www.vogella.com/tutorials/JavaRegularExpressions/article.html>>, 2019, 15 pages.

"Document.querySelector()", retrieved from <<https://developer.mozilla.org/en-US/docs/Web/API/Document/querySelector>>, no later than Apr. 1, 2020, 16 pages.

"Microsoft Program Synthesis using Examples SDK", retrieved from <<https://microsoft.github.io/prose/>>, no later than Apr. 1, 2020, 2 pages.

"Tutorial", retrieved from <<https://microsoft.github.io/prose/documentation/prose/tutorial/>>, no later than Apr. 1, 2020, 13 pages.

"Intelligent code completion", retrieved from <<https://en.wikipedia.org/wiki/Intelligent_code_completion>>, Jan. 24, 2020, 5 pages.

"Autocomplete", retrieved from <<https://en.wikipedia.org/wiki/Autocomplete>>, Mar. 12, 2020, 8 pages.

"Integrated development environment", retrieved from <<https://en.wikipedia.org/wiki/Integrated_development_environment>>, Feb. 11, 2020, 4 pages.

Amanda Silver, "Introducing Visual Studio IntelliCode", retrieved from <<https://devblogs.microsoft.com/visualstudio/introducing-visual-studio-intellicode/>>, May 7, 2018, 5 pages.

(56) References Cited

OTHER PUBLICATIONS

Anders Miltner, et al., "On the Fly Synthesis of Edit Suggestions", retrieved from <<https://www.microsoft.com/en-us/research/uploads/prod/2019/08/PBE-OOPSLA-2019.pdf>>, 2019, 29 pages.

Gabriele Tomassetti, "A Guide to Code Generation", retrieved from <<https://tomassetti.me/code-generation/>>, May 9, 2018, 33 pages.

"Pick the right tools for .NET development", retrieved from <<https://www.jetbrains.com/dotnet/promo/tools/>>no later than Apr. 2, 2020, 5 pages.

"PyCharm", retrieved from <<https://en.wikipedia.org/wiki/PyCharm>>, Feb. 29, 2020, 3 pages.

"Eclipse (software)", retrieved from <<https://en.wikipedia.org/wiki/Eclipse_(software)>>, Mar. 31, 2020, 12 pages.

Ian Drosos, et al., "Wrex: A Unifed Programming-by-Example Interaction for Synthesizing Readable Code for Data Scientists", retrieved from <<https://www.microsoft.com/en-us/research/uploads/prod/2020/03/chi20c-sub4932-cam-i16.pdf>>, no later than Apr. 2, 2020, 12 pages.

"Find patterns in strings with the Microsoft PROSE Code Accelerator SDK", retrieved from <<https://docs.microsoft.com/en-us/python/api/overview/azure/prose/findpatterns?view=prose-py-latest>>, Sep. 24, 2018, 7 pages.

"Programming language", retrieved from <<https://en.wikipedia.org/wiki/Programming_language>>, Apr. 14, 2020, 22 pages.

Nicholas Samuel, "How to Format Dates in Python", retrieved from <<https://stackabuse.com/how-to-format-dates-in-python/>>, no later than Apr. 17, 2020, 16 pages.

Beau Carnes, "The Python Modulo Operator—What Does the % Symbol Mean in Python? (Solved)", retrieved from <<https://www.freecodecamp.org/news/the-python-modulo-operator-what-does-the-symbol-mean-in-python-solved/>>, Dec. 29, 2019, 6 pages.

* cited by examiner

US 11,074,048 B1

AUTOSYNTHESIZED SUBLANGUAGE SNIPPET PRESENTATION

BACKGROUND

Computer software is written in computer programming languages, which may also be referred to as "programming languages" or even as "languages" when the context excludes "natural languages" such as English, Spanish, Chinese, and so on. To be executed in a computing system, programs written in a programming language are translated into "machine language" that is recognized by the processing chips and other hardware of the computing system. Translation may be done by tools which are themselves computer programs, known individually as "compilers" or "interpreters" and collectively as "translators". To permit translation, programming language text known as "source code" must conform with syntax rules (rules of form) that are enforced by the translator being used to translate the source code into machine language. To perform operations that produce the intended results of program execution, the source code must also properly implement those operations in a manner that is consistent with the semantics (rules of meaning) of the programming language.

The foregoing is merely an introduction. For instance, previously translated software in the form of libraries, operating systems, or hypervisors may also be invoked or otherwise relied upon by a given program. Therefore, the source code of a program often does not include source code for some machine language instructions the translated program will nonetheless execute. However, the program source code should conform with the syntax and semantics of the interfaces through which the translated program communicates with previously translated software. For example, a call to an operating system function or a library function is normally expected to include certain parameters in a certain order, with each parameter having a specified data type (integer, character string, etc.) and with the parameter values, the choice of which function to call, and the location of the function call all conforming with a desired semantics.

SUMMARY

Some embodiments described in this document provide improved technology for software programming which increases developer productivity and improves program execution accuracy with respect to documented test cases. Some embodiments facilitate efficient and reliable synthesis and integration of source code written in sublanguages, including complex sublanguages which are used for print formatting, component selection, or other specialized subtasks within a program, when the program is being written in both the sublanguage and a larger programming language. Some embodiments provide sublanguage source code that is synthesized on the basis of hypothetical execution result examples provided by a developer, thereby allowing the developer to focus the workflow within an integrated development environment instead of breaking focus to go search online forums or other external documentation for potentially helpful code snippets.

Some embodiments use or provide a software development hardware and software combination which includes a digital memory, a processor which is in operable communication with the memory, and an executable software development tool having a graphical user interface. The processor is configured, e.g., by tailored software, to perform software development workflow steps for presentation of an autosynthesized sublanguage code snippet in the user interface. The steps may include (a) detecting a sublanguage delimiter in a programming language source code that is displayed in the user interface, (b) receiving through the user interface a user-provided example, namely, an example from a user of a value taken or other result of a sublanguage code execution, (c) submitting the user-provided example to a sublanguage code synthesizer, (d) getting the autosynthesized sublanguage code snippet from the sublanguage code synthesizer, and (e) displaying the autosynthesized sublanguage code snippet in the user interface. These embodiments may provide a software developer with autosynthesized sublanguage code which has an execution that produces the example entered by the developer. Moreover, the embodiments can accomplish this without requiring the developer to consult any sublanguage code guidance that is located outside the user interface, such as code repositories, developer online forums, or textbooks.

Some embodiments use or provide steps of a software development workflow method. The steps may include automatically detecting a sublanguage delimiter in a programming language source code that is displayed in a user interface of a software development tool, receiving through the user interface as a user input a first user-provided example and displaying the first user-provided example at a display location which is indicated with the sublanguage delimiter, with the first user-provided example including an example of a sublanguage code execution result, electronically submitting the first user-provided example to a sublanguage code synthesizer, electronically getting an autosynthesized sublanguage code snippet from the sublanguage code synthesizer, and displaying the autosynthesized sublanguage code snippet in the user interface at the display location in place of the first user-provided example. This method provides a software developer with autosynthesized sublanguage code without requiring the developer to consult any sublanguage code guidance located outside the user interface.

Some embodiments use or provide a computer-readable storage medium configured with data and instructions, or use other computing items, which upon execution by a processor cause a computing system to perform a method to perform a software development workflow method. In particular, some embodiments receive through a user interface of a software development tool a first user-provided example, the first user-provided example including an example of a sublanguage code execution result. They display the first user-provided example in the user interface, electronically submit the first user-provided example to a sublanguage code synthesizer, electronically get an autosynthesized sublanguage code snippet from the sublanguage code synthesizer, and display the autosynthesized sublanguage code snippet in the user interface. Accordingly, these embodiments provide a software developer with autosynthesized sublanguage code without requiring the developer to consult any sublanguage code guidance that is located outside the user interface.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
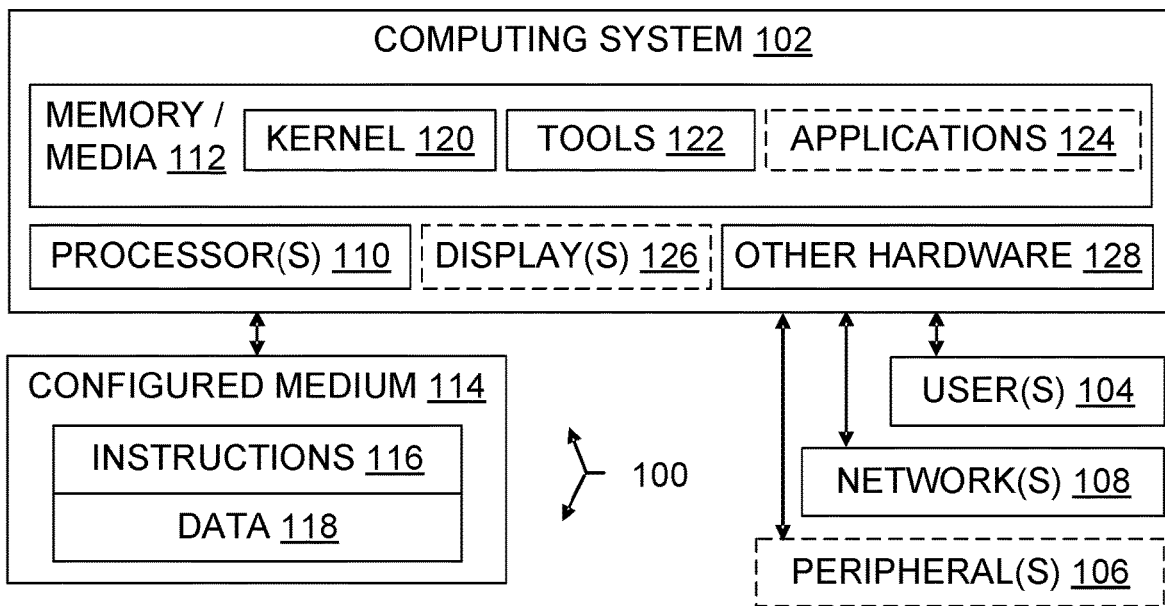
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the feature set and usability of Microsoft development tool offerings, including some versions of Microsoft Visual Studio® or VSCode™ integrated development environments (marks of Microsoft Corporation).

Initially, the innovators recognized that many programming languages support what might be called "internal minilanguages" in order to solve particular problems. Examples of these are date formatting languages that allow the user to specify the rendering of a date format in the form of a string, regular expressions which allow pattern matching of strings, cascading style sheet (CSS) selectors, and many others. These minilanguages are difficult and error-prone to work with, which often makes development in them time-consuming, and therefore use of minilanguages provided an opportunity for improvements in development tool functionality.

Users have received limited assistance from their development tools (e.g., integrated development environments, source code editors) when constructing code in these minilanguages. Lack of assistance harms productivity and program correctness because code in these minilanguages is often terse and hard to read, and even more difficult to write. This lack of assistance resulted in many hours spent searching and scrutinizing documentation (e.g., online forums, language manuals, textbooks, and code located in-house or in repositories) as developers tried to find helpful implementation examples of the minilanguage functionality they wished to include in their programs. Moreover, adapting the minilanguage code examples that were found has often proceeded fitfully by manual trial-and-error until a correct result is obtained. Such approaches to minilanguage coding are tedious and error prone.

The innovators decided to pursue an autocompletion approach, that is, an approach in which a development tool proactively offers coding suggestions to a developer as the developer is writing code. Consequently, a technical challenge the innovators faced was to how to provide an autocompletion functionality for specialized minilanguages within a source code editor or other development tool. Upon further consideration, an emergent technical challenge was how to leverage code synthesizer functionality, which synthesizes code based on code execution result examples, without also placing productivity dampers on existing software development workflows. One of skill will recognize these and other technical challenges of synthesized code presentation as they are addressed at various points within the present disclosure.

To address such challenges, some embodiments allow developers to create one or more examples of the desired execution result of a segment of minilanguage, such as a date string which is a desired result of a date string formatting operation (e.g., "6 Aug. 1991"), or an example of strings the user wants a regular expression to match ("e.g., "Contoso" or "contoso.com"). An embodiment then uses Microsoft PROSE™ technology or another program synthesis technology to synthesize minilanguage code that implements computational operations that produce the desired results (mark of Microsoft Corporation). This suggested minilanguage code is then displayed to the developer in the form of an autocompletion suggestion in their integrated development environment (IDE) or text editor, where the developer's attention is already focused.

Providing this sort of automated assistance can make development work significantly easier and less error prone for the developer. It can increase productivity, and reduce errors, in comparison to manual construction or trial-and-error attempts based on code gleaned from online forum examples and other minilanguage guidance documentation.

To help prevent confusion, minilanguages are referred to herein as "sublanguages" and automatically created segments of minilanguage are referred to as "autosynthesized" code, or as code "snippets" since they tend to be short in comparison to the surrounding program source code in which they are inserted.

As used herein, "autosynthesized" code is code that is automatically synthesized on the basis of one or more execution result examples. Although "code generator" and "code synthesizer" may be used interchangeably by some, a distinction is made herein between code synthesis and code generation. Code synthesis creates code based on examples of what the code should produce when executed, e.g., code to format binary time values into printable character strings may be automatically synthesized using an example such as "4:32 PM". Code generation, by contrast, often involves translation from one computing language to another, e.g., from C++ to machine language, or from Python® to byte code (mark of Python Software Foundation). "Code generation" is also used in reference to other computational activities, but to help avoid confusion, terms such as "autosynthesized" and "code synthesizer" are used herein, to emphasize the production of code based on user-provided examples of code execution results.

Also, "presentation" is understood broadly, to include not merely displaying code snippets but also operations involved in obtaining, organizing, or submitting the desired result examples on the basis of which the snippets are synthesized.

Other aspects of these embodiments, and other software development workflow enhancement embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" (and "execution") are used in a broad sense herein to include (running) machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, sublanguage snippet presentation functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More About Systems

Figure 2:
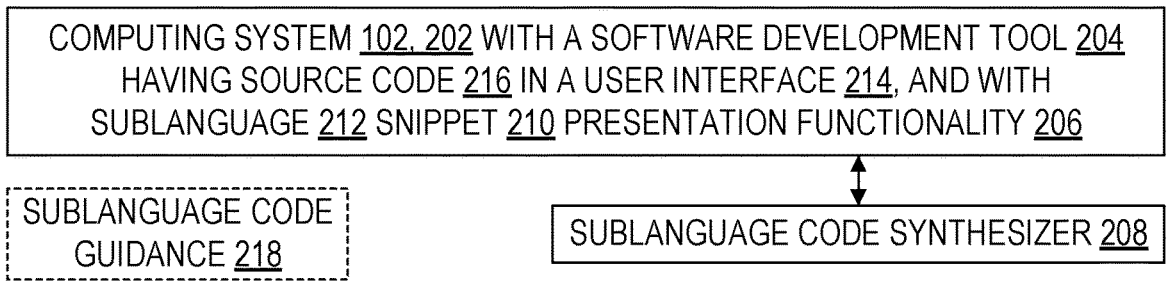
FIG. 2 is a block diagram illustrating a computing system equipped with sublanguage code snippet presentation functionality, and some aspects of a surrounding context.

FIG. 2 illustrates an environment having an enhanced system 202, 102 with a software development tool 204 that includes sublanguage snippet presentation functionality 206. This presentation functionality 206 obtains desired result examples, submits them to a sublanguage code synthesizer 208, and displays the resulting snippets 210 of sublanguage 212 code in a user interface 214 of the software development tool 204.

In general, the snippets 210 will be displayed as part of a larger body of source code 216 which is written in a programming language more extensive than the sublanguage 212. A snippet 210 may be considered a program within a program, and a sublanguage may be considered a language within a language. For instance, a snippet 210 to format a date string may be displayed in program source 216 that is also written in C#, C++, Objective-C, Fortran, COBOL, Java, Python, Perl, or another general-purpose programming language.

This presentation functionality 206 allows the software developer to obtain sublanguage 212 code that operates as desired, without breaking workflow focus by searching and scrutinizing external sublanguage code guidance 218 such as online forums, language manuals, textbooks, and code located outside the particular project the developer is working on. Indeed, such sublanguage code guidance 218 need not even be present in the developer's working environment 100.

Figure 3:
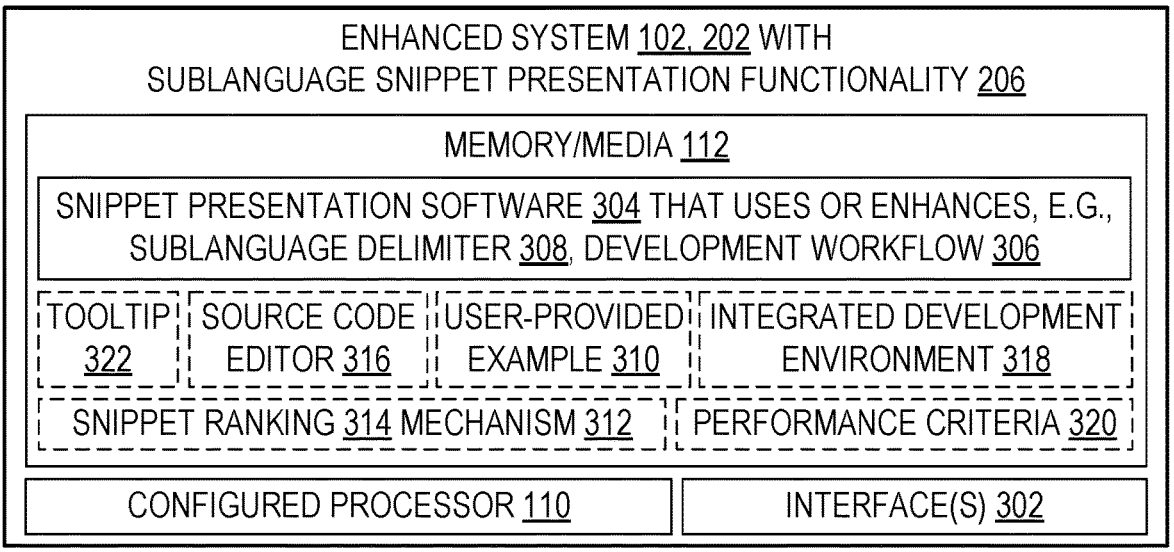
FIG. 3 is a block diagram illustrating an enhanced computing system configured for sublanguage code snippet presentation.

FIG. 3 illustrates an enhanced system 202 which is configured with sublanguage snippet presentation functionality 206. The system 202 may be networked generally or communicate via network packets, shared memory, shared files, or otherwise with a cloud, other network(s) 108, and other computing devices through one or more interfaces 302. An interface 302 may include hardware such as network interface cards, software such as network stacks, APIs, or sockets, combination items such as network connections, or a combination thereof.

The illustrated system 202 includes snippet presentation software 304 which performs operations such as detecting sublanguage delimiters 308 that indicate where a snippet 210 is to be inserted, receiving examples 310 of desired results of sublanguage snippet execution, getting autosynthesized sublanguage snippets, and displaying one or more sublanguage snippets 210 to the developer 104. In particular, the snippet presentation software 304 may perform a method 900 illustrated in one or more of FIGS. 8 and 9. In some embodiments the snippet presentation software 304 includes or invokes a snippet ranking mechanism 312 which produces a ranking 314 of sublanguage snippets, as discussed elsewhere herein.

In some embodiments, the snippet presentation software 304 is part of, or communicates with, a source code editor 316, or an integrated development environment (IDE) 318. The snippet presentation software 304 may be part of both, or communicate with both, since an IDE 318 may include an editor 316.

In some embodiments the snippet presentation software 304 is designed and configured to comfortably enhance an existing development workflow 306. Such "comfortable enhancement" may be accomplished, e.g., by virtue of an embodiment having one or more of the following characteristics: (a) not requiring a developer to consult guidance 218 outside the development tool 204 user interface 214, (b) enhancing one or more familiar development functionalities such as autocompletion or background compilation, (c) utilizing familiar user interface mechanisms (albeit in new ways) such as dialog boxes, tooltips 322, cursors, visual highlighting, and flowing of text in response to text insertion, (d) using sublanguage syntax and semantics that are consistent with the particular version of a sublanguage 212 that is recognized in the developer's current development context (e.g., Python® syntax and semantics for date formatting when the source code 216 receiving a sublanguage snippet insertion is written in the Python® language) (mark of Python Software Foundation), or (e) satisfying 906 performance criteria 320 that make snippet presentation fast enough to avoid developer frustration from waiting for snippets to appear in the code 216. Some embodiments have one of these comfortable enhancement characteristics, some have two, some have three, some have four, and some have all five.

Figure 4:
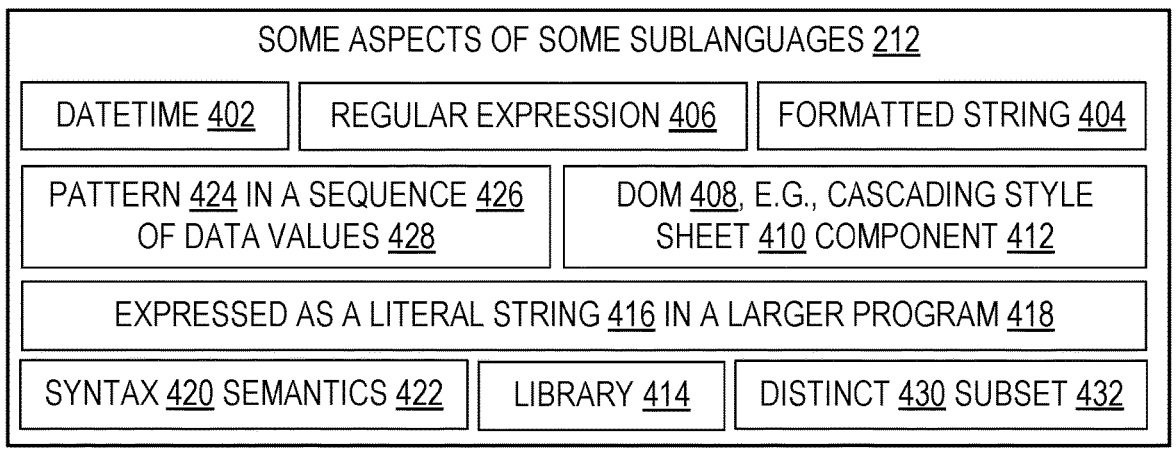
FIG. 4 is a block diagram illustrating some aspects of some sublanguages.

FIG. 4 illustrates some aspects of sublanguages 212. Any given sublanguage will conform with one or some or all of the aspects discussed here.

Many of the native or imported libraries 414 available to a developer are each a potential basis or working definition of a sublanguage 212. For instance, a datetime library operationally defines a sublanguage 212 of date and time expressions 402, a string library operationally defines a sublanguage 212 for string formatting, string manipulation, and other operations on string expressions 404, a regex library operationally defines a sublanguage 212 for working with regular expressions 406, a pattern matching library operationally defines a sublanguage 212 for finding a specified pattern 424 in a sequence 426 of data values 428 (finding matching substrings is a special case of pattern matching generally), and a Document Object Model (DOM) library operationally defines a sublanguage 212 for manipulating DOM data structures 408 and related data items such as cascading style sheet 410 components 412. In JavaScript® environments, some of the packages whose utilization in source code may benefit from autosynthesis of sublanguage snippets include packages that provide or operate with date and time, regular expressions, string formatting, file globs, and data transformation (mark of Oracle America, Inc.).

Another aspect of many sublanguages 212 is their expression as a literal string 416 inside a larger program 418. This literal string has a specific syntax and semantics, which differs from the syntax and semantics of the larger program 418.

For instance, some Python® implementations use or provide a datetime module 414 which includes a date-to-formatted-string routine strftime( ). Using this library, the string "6 Aug. 1991" can be printed by running the following code:
import datetime
x=datetime.datetime(1991, 8, 6)
print(x.strftime("% d % b % Y"))

In this example, "% d % b % Y" is a literal string 416 inside a Python® program, and is consistent with the syntax 420 and semantics 422 of a datetime sublanguage 212. For instance, in the datetime sublanguage a percent sign followed by the character d indicates a numeric day of the month, a percent sign followed by the character b indicates the first three characters of the name of a month, and a percent sign followed by the character Y indicates a four-digit year. Also, spaces are printed as shown in the literal string, so putting two spaces in a row gives a different result than putting only one space, for instance. But outside the literal string—outside the scope of the sublanguage, back in Python code—the percent sign follows a different syntax 420 and semantics 422. In Python code, the percent sign indicates a binary arithmetic operator referred to as the "modulo operator"; x % y returns the remainder of dividing the value of x by the value of y. Moreover, the Python interpreter or compiler generally makes no distinction between two adjacent spaces and a single space.

Thus, an aspect of many sublanguages is that the sublanguage is a subset of a larger programming language in which the user 104 is programming, or is aggregated into that larger programming language (e.g., a regex 406 sublanguage 212 may be implemented within, and thereby aggregated into, multiple larger programming languages such as C++, Python, C#, and so on). In some cases the sublanguage is a self-contained 430 subset 432 which does not depend on the rest of the larger language with respect to syntax 420 or semantics 422. The datetime sublanguage, for instance, is not dependent on the presence of the modulo operator in the Python language or on the use of a percent sign to indicate the modulo operator. Indeed, in this case the datetime sublanguage requires nothing of a Python interpreter or compiler except the datetime library and some support for literal strings, e.g., recognition of a double quote as a string delimiter 308, 914.

Figure 5:
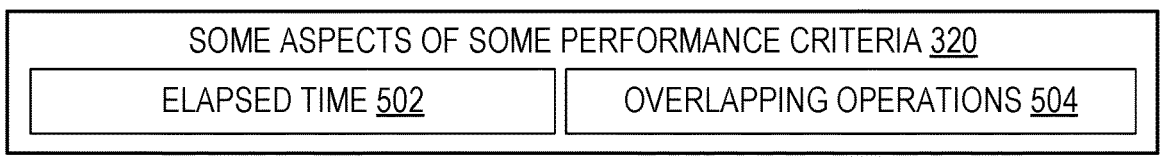
FIG. 5 is a block diagram illustrating some examples of performance criteria for some enhanced systems.
Figure 6:
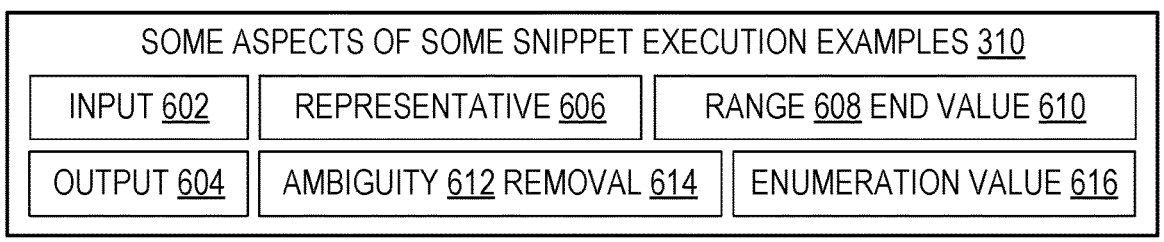
FIG. 6 is a block diagram illustrating aspects of some examples of actual or hypothetical sublanguage code snippet execution results.
Figure 7:
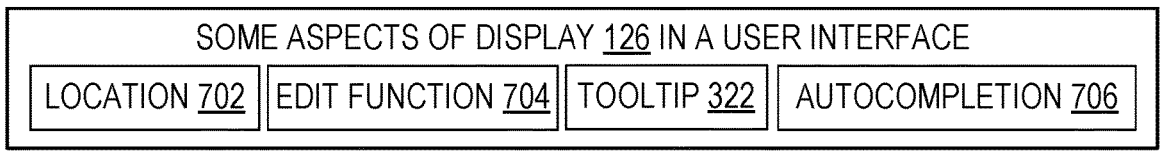
FIG. 7 is a block diagram illustrating some aspects of displaying items in user interfaces.

FIG. 5 illustrates some examples of performance criteria 320. FIG. 6 illustrates some aspects of some snippet execution result examples 310; these may be actual execution results or hypothetical desired results. FIG. 7 illustrates some aspects of a display 126 which is configured by a user interface 214. These illustrated items are discussed at various points herein, and additional details regarding them are provided in the discussion of a List of Reference Numerals later in this disclosure document.

With reference now to all of the drawing figures, some embodiments use or provide a functionality-enhanced system, such as system 202 or another system 102 that is enhanced as taught herein. In some embodiments, a system which is configured for software development includes a digital memory 112, an executable software development tool 204 having a user interface 214, and a processor 110 in operable communication with the memory. The processor 110 is configured to perform software development workflow 306 steps for presentation of an autosynthesized sublanguage code snippet 210 in the user interface. The steps may include (a) detecting 804 a sublanguage delimiter 308 in a programming language source code 216 that is displayed in the user interface 214, (b) receiving 806 through the user interface as a user input a user-provided example 310, namely, an example from a user of a value taken or other result of a sublanguage code execution, (c) submitting 808 the user-provided example 310 to a sublanguage code synthesizer 208, (d) getting 810 the autosynthesized sublanguage code snippet 210 from the sublanguage code synthesizer, and (e) displaying 812 the autosynthesized sublanguage code snippet 210 in the user interface 214. Consequently, the system 202 provides a software developer with autosynthesized sublanguage code 210 which has an execution that produces the example 310 entered by the developer, and does so without requiring the developer to consult 820 any sublanguage code guidance 218 that is located outside the user interface.

In particular, in some embodiments the software development tool 204 is an IDE 318 or a source code editor 316. In some embodiments, the user interface 214 is a command line interface or a graphical user interface (GUI), although it is contemplated that many embodiments will have a graphical user interface 214. The user interface 214 may use or include suitably adapted mechanisms such as a dialog box, a grid, a comma-separated list, or other command-line or GUI interaction mechanisms.

In some embodiments, a sublanguage code snippet may be displayed by a tooltip 322. In particular, in some the user interface 214 includes a tooltip, and the system 202 displays the autosynthesized sublanguage code snippet 210 in the user interface tooltip 322.

As noted herein, various sublanguages 212 exist. One of skill will acknowledge that the teachings provided herein may be beneficially applied to a variety of existing sublanguages 212 and to sublanguages which may be defined hereafter. In some embodiments, the autosynthesized sublanguage code snippet 210 includes at least one of the following: sublanguage source code which upon execution renders a date or time 402 in a formatted string 404, sublanguage source code which upon execution tests data 118 against a regular expression 406, sublanguage source code which upon execution matches a pattern 424 in a sequence 426 of data values 428, 118, or sublanguage source code which upon execution selects a cascading style sheet component 412.

An acceptable performance speed may be beneficial or in some scenarios critical to acceptance and usage of presentation functionality 206 by developers. Acceptability may be defined, for instance, as satisfaction 906 of one or more specified performance criteria 320 regarding speed or responsiveness. One of skill may select the specific performance criteria 320 to apply in a given implementation or scenario, based on developer expectations and experiences.

In some embodiments, the system 202 satisfies at least one of the following performance criteria 320.

One hard-coded cutoff criterion 320 holds that the time 502 elapsed from finishing receiving the user-provided example to finishing displaying the autosynthesized sublanguage code snippet in the user interface is not more than two hundred and fifty milliseconds. Another, stricter, hard-coded cutoff criterion 320 holds that said time is not more than one hundred milliseconds.

A typing speed criterion 320 holds that an acceptable speed is provided when the system displays the whole snippet as fast as the user types one key. In particular, one typing speed criterion 320 holds that the time 502 elapsed from finishing receiving the user-provided example to finishing displaying the autosynthesized sublanguage code snippet in the user interface is less than an average time between consecutive keystrokes received in the user interface during the previous sixty seconds.

An autotrigger criterion 320 holds that displaying the snippet before the user finishes typing the user-provided example is sufficiently fast. In particular, one autotrigger criterion 320 is met when the enhanced system 202 displays the autosynthesized sublanguage code snippet in the user interface while the user-provided example is being received in the user interface. This is an example of overlapping operations 504 as a performance criterion 320.

An autocompletion criterion 320 holds that displaying the snippet as fast as an autocompletion tool could display a suggested identifier list is sufficiently fast. In particular, one autocompletion criterion 320 is met when the time elapsed from beginning to receive the user-provided example to finishing displaying the autosynthesized sublanguage code snippet in the user interface is less than an average time over a past five identifier autocompletions 706, each identifier autocompletion including the tool recognizing a portion of an identifier which is being entered and displaying an identifier autocompletion list in the tool.

A prescient user criterion 320 holds that it is acceptable to display the whole snippet at least as fast as if the user already knew exactly what to type and typed in the snippet manually. In particular, one prescient user criterion 320 is met when the time elapsed from finishing receiving the user-provided example to finishing displaying the autosynthesized sublanguage code snippet in the user interface is less than an average time for manual entry of a string which has the same length in characters as the autosynthesized sublanguage code snippet.

It is contemplated that in many scenarios the software development tool 204 will be otherwise include an integrated development environment 318. Some IDEs 318 which are suitable for enhancement as taught herein include a Microsoft® Visual Studio® integrated development environment (Microsoft and Visual Studio are marks of Microsoft Corporation), a NetBeans® integrated development environment (NetBeans is a mark of Oracle America, Inc.), an Eclipse™ integrated development environment (Eclipse is a mark of Eclipse.org Foundation, Inc.) and other integrated development environments. Thus, in some embodiments the software development tool 204 includes an integrated development environment 318.

Some synthesizer technologies 208, including some versions of Microsoft PROSE™ synthesizers 208, are capable of receiving and learning from multiple examples 310 as a basis for the synthesis of code snippets 210. In some cases, only positive examples or only negative examples are used, but in other cases both positive examples 310 and negative examples 310 may each guide code synthesis. A positive example 310 illustrates a result the synthesized code should provide upon its execution, while a negative example 310 illustrates a result the synthesized code should avoid providing upon its execution.

Moreover, some synthesizer technologies 208, including some versions of Microsoft PROSE™ synthesizers 208, are capable of synthesizing multiple code snippets 210 in response to a single example 310, or in some cases in response to multiple examples 310. More generally, the relationship between example(s) 310 submitted 808 to a given synthesizer 208 and code snippet(s) 210 synthesized and gotten 810 from the synthesizer 208 based on the submitted example(s) 310 may be one-to-one, one-to-many, many-to-one, or many-to-many in a particular embodiment or even in a particular operational instance.

When multiple snippets are created, in some situations they may also be automatically ranked 314 for display to the developer 104. An embodiment which does ranking 314 may do so with one or more ranking mechanisms 312; when multiple ranking mechanisms 312 are used, their results may be given respective weights to determine a final ranking for display. A ranking mechanism 312 may utilize, for instance, a machine learning model that has been trained on the developer's own code so that higher ranked snippets more closely resemble the developer's own code. A ranking mechanism 312 may instead or in addition simply measure snippet length and favor shorter snippets 210 by ranking them higher. Ranking mechanisms 312 may also utilize other ranking criteria.

With the foregoing in mind, one of skill will be prepared to acknowledge that in some embodiments a system 202 may be characterized by at least one of the following characterizations of examples-to-snippets relationships. Under one characterization, multiple user-provided examples 310 are received 806 and submitted 808 to the sublanguage code synthesizer 208 as related examples, and the autosynthesized sublanguage code snippet 210 which is gotten 810 from the sublanguage code synthesizer outputs 604 each example upon execution of the snippet with a corresponding input. Under another characterization, multiple sublanguage code snippets 210 are gotten 810 from the sublanguage code synthesizer 208, the sublanguage code snippets are ranked 314 relative to each other, and the sublanguage code snippets are displayed 812 together in the user interface 214 in a ranked order. Under another characterization which allows but does not require ranking 314, multiple sublanguage code snippets 210 are gotten 810 from the sublanguage code synthesizer 208 and are displayed 812 together in the user interface.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, ranking mechanisms, operation sequences, data structures, sublanguages, or specific presentation functionalities for instance, and may otherwise depart from the examples provided herein.

Processes (a.k.a. Methods)

Figure 8:
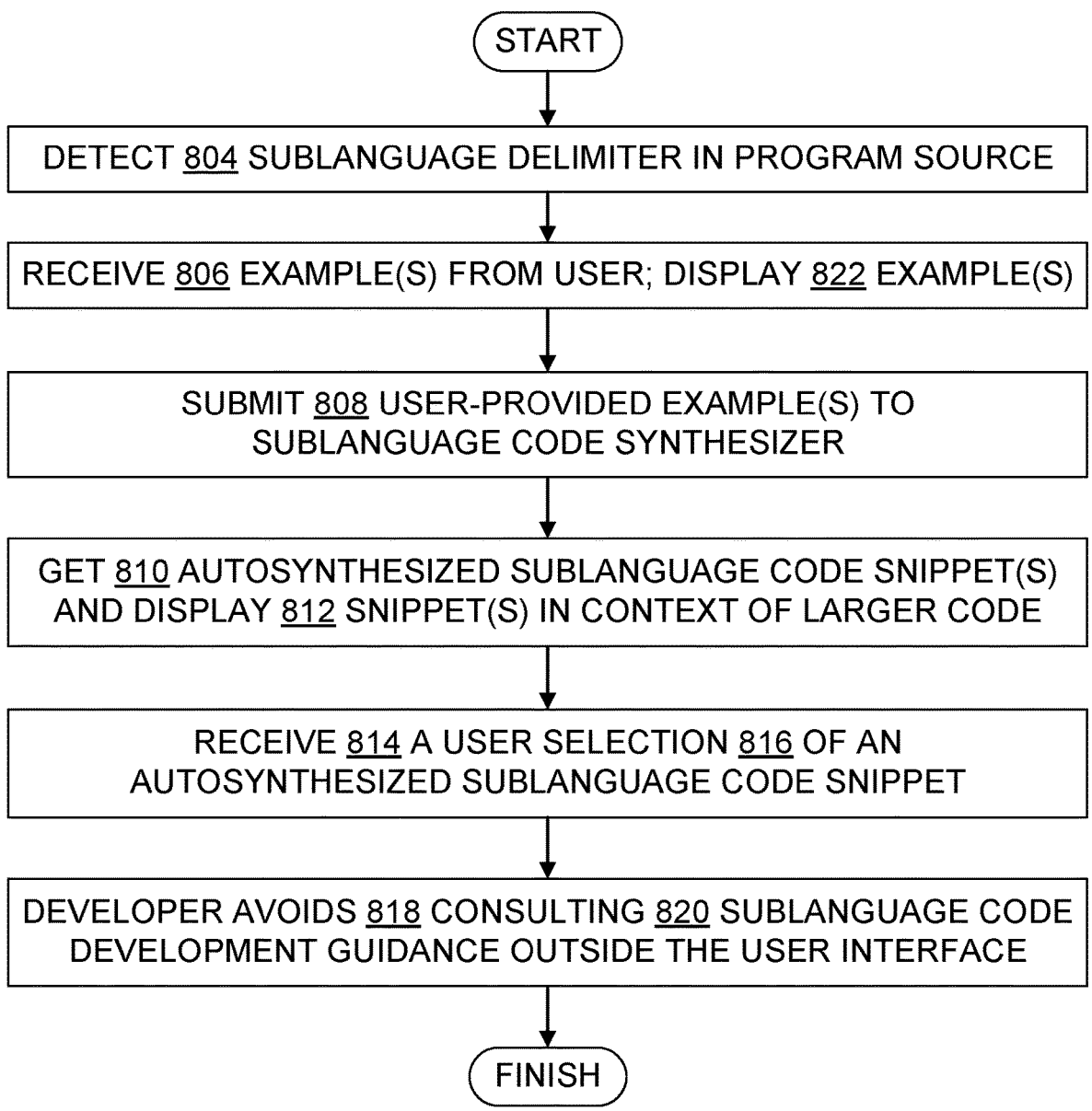
FIG. 8 is a flowchart illustrating steps in some sublanguage code snippet presentation methods, which are examples of software development workflow methods.
Figure 9:
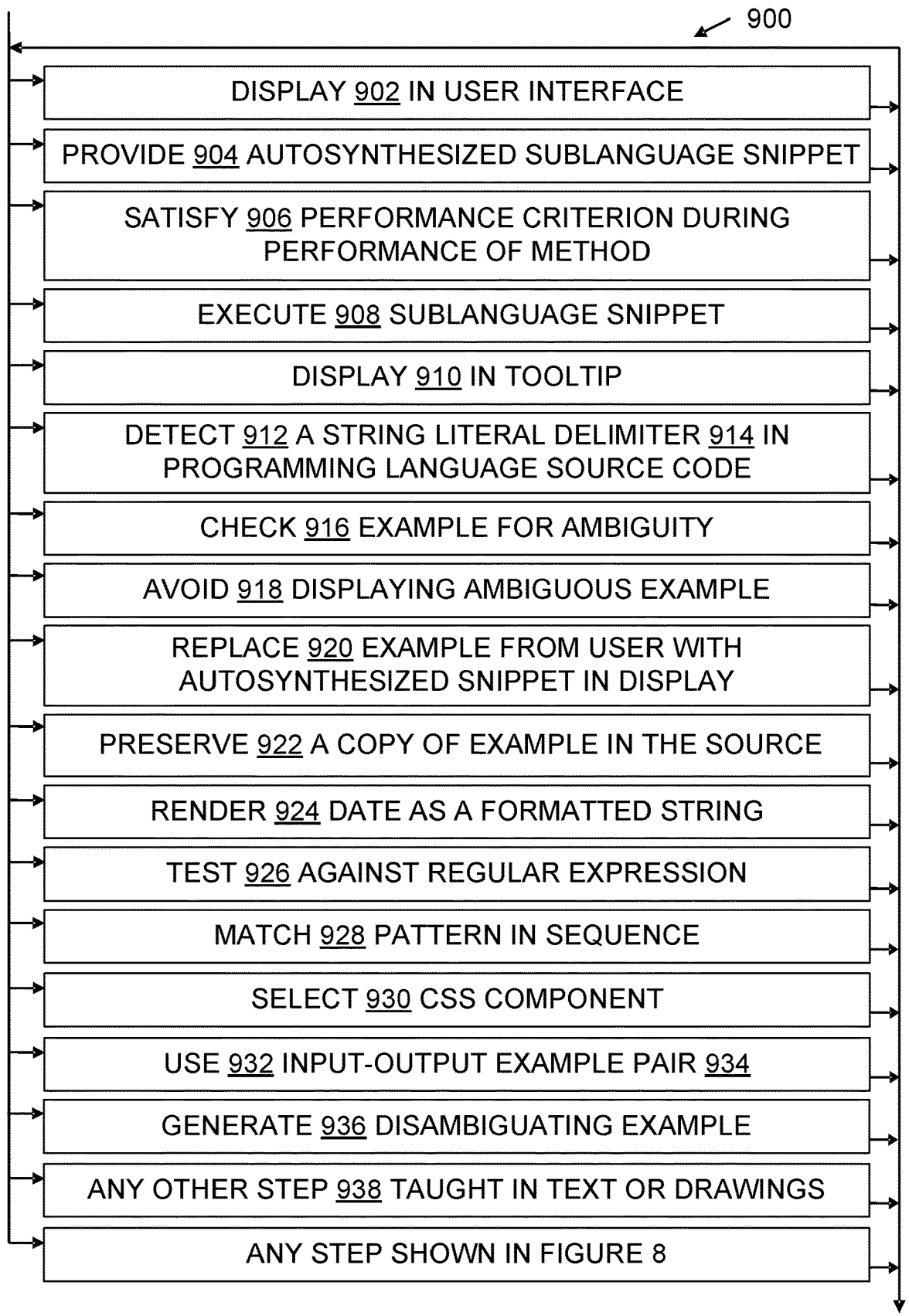
FIG. 9 is a flowchart further illustrating steps in some software development workflow methods.

FIG. 8 illustrates a family of autosynthesized sublanguage snippet presentation methods 800 that may be performed or assisted by an enhanced system, such as system 202 or another functionality 206 enhanced system as taught herein. FIG. 9 further illustrates sublanguage snippet presentation methods and other software development workflow methods (which may also be referred to as "processes" in the legal sense of that word) that are suitable for use during operation of a system which has innovative functionality taught herein. FIG. 9 includes some refinements, supplements, or contextual actions for steps shown in FIG. 8, as well as methods which do not necessarily involve steps of FIG. 8. FIG. 9 as a whole does incorporate all steps shown in FIG. 8, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For instance, in many situations a developer 104 will manually type in an example 310 or will manually direct an editor cut-and-paste sequence, to place an example 310 in a location 702 that allows or automatically triggers example 310 submission 808 to synthesizer 208, snippet synthesis by the synthesizer 208 based at least partially on the example, and synthesized snippet display 812. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 or flowchart 900 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

In some embodiments and configurations, one or more synthesized snippets 210 are displayed concurrently with the example(s) 310 used as a basis for their synthesis, while in other embodiments or configurations the example(s) 310 are removed from display when the synthesized snippets 210 are shown.

Some embodiments use or provide a software development workflow method, including the following steps: automatically detecting 804 a sublanguage delimiter 308 (e.g., a literal string delimiter) in a programming language source code that is displayed in a user interface of a software development tool, the user interface having source code editing functionality 704; receiving 806 through the user interface as a user input a first user-provided example and displaying 822 the first user-provided example at a display location 702 which is indicated with the sublanguage delimiter, the first user-provided example including an example of a sublanguage code execution result; electronically submitting 808 the first user-provided example to a sublanguage code synthesizer; electronically getting 810 an autosynthesized sublanguage code snippet from the sublanguage code synthesizer; and displaying 812 the autosynthesized sublanguage code snippet in the user interface at the display location in place of the first user-provided example. Thus, the method provides 904 a software developer with auto-synthesized sublanguage code without requiring 818 the developer to consult 820 any sublanguage code guidance 218 located outside the user interface's source code editing functionality.

In addition to the examples 310 that are input by a user, some embodiments display 822 other examples 310 to illustrate the snippet 210. One or more additional examples 310 may be shown, e.g., when a user mouses over the code snippet. Thus, an embodiment may display 822 date outputs the snippet would produce or display patterns the snippet would match when executed, for instance, depending on the sublanguage involved. In particular, such an additional example 310 may be a representative example 606, 310 which helps users distinguish between code snippets when multiple snippets would also generate a non-representative example but would differ in whether they also generate the representative example.

Accordingly, in some embodiments the method includes displaying 822 a second example which is producible by execution of the autosynthesized sublanguage code snippet. In some of these the second example is not an example 310 which was recently input by the user, e.g., input within the past minute. In some, the second example was not input by the user at all, but instead was generated by the system 202.

In some embodiments, the second example (and in some cases a third, fourth, etc. example 310) is a representative example 310, 606. For instance, in some embodiments the second snippet execution result example is a representative example in at least one of the following ways.

The second example 606, 614 may remove an ambiguity that was left by the first example. For instance, a second example 2020-04-30 resolves 614 an ambiguity 612 of a first example 2020-04-02 in that the second example shows year-month-day is the only order permitted whereas 2020-04-02 is ambiguous as to whether the order is year-month-day or year-day-month.

The second snippet execution result example 606 may illustrate an end value 610 of a range 608 of values. For instance, a second example 2020-04-30 illustrates an end value for the range of days in April.

The second snippet execution result example 606 may illustrate an enumeration value 616 that was not shown in the first example. For instance, a second example 6:30 PM illustrates an enumeration value (PM) that is not shown in a first example 11:30 AM.

It is contemplated that in many embodiments, sublanguage code will be located inside a literal string within the primary language source code. Python, as well as descendant languages of the C programming language, and many other programming languages, often control the format of their string outputs by using format strings. Format strings, such as "% d % b % Y" in the Python example above, are syntactically literal strings as far as these primary programming languages are concerned, but the format strings operate as sublanguage code snippets 210 inside called routines such as printf( ), strftime( ), and other library routines that produce formatted strings based on format strings. Accordingly, in some embodiments detecting 804 the sublanguage delimiter 308 in the programming language source code 216 includes detecting 912 a string literal delimiter 914. Perhaps the most frequently used string literal delimiters 914 are double quotes or single quotes (typically in a pair with the literal string between them), but teachings herein may also be advantageously applied when other string literal delimiters 914 are used.

As a further aid to programmer productivity, some embodiments preserve a copy of the snippet execution result example 310 in the source 216, after the original example is replaced by the snippet inside the string. This may be done, e.g., by automatically inserting a comment containing the example, but other preservation approaches are also possible, e.g., by putting an example 310 in a string literal or in debugger metadata. In particular, in some examples the method includes preserving 922 a copy of the example at a location other than the display location, and in association with the programming language source code and the autosynthesized sublanguage code snippet.

For instance, in the Python example above, the display may include this line with a partial example 310 of a formatted date, as the user is typing: print(x.strftime("6 August As the user continues typing and completes the example 310, the displayed line will look something like this:
print(x.strftime("6 Aug. 1991"))

In this particular scenario, assume that the completed example which was input by the user, 6 Aug. 1991 (or "6 Aug. 1991" if the implementation includes the delimiters), is now submitted 808 to a datetime sublanguage snippet synthesizer 208, and that a sublanguage snippet % d % b % Y (or "% d % b % Y" if the implementation includes the delimiters) is gotten 810 back from the snippet synthesizer 208.

Then one user interaction approach an embodiment may implement is to simply replace the example with the snippet:
print(x.strftime("% d % b % Y"))

However, another interaction approach is to replace the example but also preserve a copy of the example in the source code as documentation (in the line below # marks the start of a comment in Python):
print(x.strftime("% d % b % Y")) #6 Aug. 1991

Other interaction approaches are also possible, e.g., a user may be given 812 a choice of synthesized snippets, multiple examples 310 may have been received 806 from the user and then preserved 922, received examples may be supplemented by autogenerated representative examples 606, and so on, as taught herein.

In some embodiments, a representative snippet execution result example 606 may be generated internally, or be taken from earlier user-generated examples, or both. However, not all generated or received examples 310 will be representative. One way to decide whether an example is representative is to check it for ambiguity by seeing whether the sublanguage snippet synthesizer 208 creates multiple snippets based on the example. Examples 310 which are the basis of multiple synthesized snippets are ambiguous examples, thus deemed non-representative.

In some embodiments, the method includes automatically checking 916 a candidate snippet execution result example for ambiguity 612 by submitting 808 the candidate example to the sublanguage code synthesizer, and then avoiding 918 displaying the candidate example with the autosynthesized sublanguage code snippet if the sublanguage code synthesizer synthesizes more than one snippet based on the candidate example.

In some embodiments, the user might provide an input-output pair as an example, rather than providing only output in the example 310. In particular, some methods include receiving 806 through the user interface a first input example which corresponds to a first output example, and displaying 822 the first input example together with the first output example at the display location which is indicated with the sublanguage delimiter.

It is contemplated that in many cases, embodiments will receive 806 multiple examples for a regex snippet; a given single example will often be consistent with multiple regular expressions, so additional examples will be used for disambiguation 614. The multiple examples 310 may be separated by an example separator, such as a comma or another specified character or character sequence, for instance, or a graphical interaction may be used, such as filling in a spreadsheet (possibly with autocompletion). In some embodiments, the method includes receiving 806 multiple examples, and the autosynthesized sublanguage code snippet 210 includes sublanguage source code which upon execution tests data 118 against a regular expression 406.

In some embodiments, the method includes generating 936 a disambiguating example 614, namely, an example which is in a first set of all outputs of the autosynthesized sublanguage code snippet and which is not in a second set of all outputs of a secondary snippet of sublanguage code. For instance, assume that "abc*" is a regular expression which matches any input string that has "ab" followed by zero or more instances of "c", and that "abc+" is a regular expression which matches any input string that has "ab" followed by one or more instances of "c". Then "ababab" is a disambiguating example 614 with respect to these two snippets because "ababab" is in the set of all match outputs of the snippet "abc*" but is not in the set of all match outputs of the snippet "abc+".

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as snippet presentation software 304, user interfaces 214, interfaces to sublanguage code synthesizers 208, snippet ranking mechanisms 312, snippet execution result examples 310, snippets 210, formatted strings 404, libraries 414, and regular expressions 406, in the form of data 118 and instructions 116, read from a removable storage medium 114 and/or another source such as a network connection, to form a configured storage medium. The configured storage medium 112 is capable of causing a computer system 102 to perform technical process steps for sublanguage code snippet presentation 802 and related functionalities, as disclosed herein. The Figures thus help illustrate configured storage media embodiments and process (a.k.a. method) embodiments, as well as system and process embodiments. In particular, any of the process steps illustrated in FIG. 8 or 9 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a software development workflow method. This method includes: receiving 806 through a user interface of a software development tool a first user-provided example, the first user-provided example including an example of a sublanguage code execution result, displaying 822 the first user-provided example in the user interface, electronically submitting 808 the first user-provided example to a sublanguage code synthesizer, electronically getting 810 an autosynthesized sublanguage code snippet from the sublanguage code synthesizer, and displaying 812 the autosynthesized sublanguage code snippet in the user interface. In this manner, the method provides 904 a software developer with autosynthesized sublanguage code without 818 requiring the developer to consult 820 any sublanguage code guidance located outside the user interface.

In some embodiments, the time elapsed 502 from finishing receiving the first user-provided example to beginning displaying the autosynthesized sublanguage code snippet in the user interface is not more than one hundred milliseconds. This is an example of a performance criterion 320.

In some embodiments, multiple autosynthesized sublanguage code snippets are gotten 810 from the sublanguage code synthesizer and the method displays 812 at least two of the multiple autosynthesized sublanguage code snippets together in the user interface, and the method further includes receiving 814 from a user a selection 816 of one of the displayed autosynthesized sublanguage code snippets.

In some embodiments, the method begins displaying 812 the autosynthesized sublanguage code snippet in the user interface while the user-provided example is being received in the user interface. This is an example of overlapping operations 504 as a performance criterion 320.

In some embodiments, the method displays 812 the autosynthesized sublanguage code snippet in the user interface while a programming language source code 216 is displayed for editing in the user interface. It is contemplated that human-visible performances that are shown to a developer in real time will be the most frequent performances of the presentation functionality 206. However, presentation 802 could also be performed in a batch manner on one or more files of source code 216 by reading the source code into working memory 112 without also displaying it for view on a screen 126, detecting 804 delimiters, parsing out examples 310, submitting 808 the examples, getting 810 synthesized snippets 210, replacing 920 the examples with the snippets, and saving and closing the modified file, all without displaying the file's contents while this method is being performed.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments use or provide methods that conform with the following. When a user is programming in the top-level programming language, and reaches a point where the next piece of code belongs to a well-defined sublanguage 212, then presentation functionality 206 provides automated sublanguage snippets that match examples 310 provided by the user. In some embodiments, the presentation functionality 206 operates as follows.

Sublanguage autocompletion 802 is triggered by automatically determining that the user intends to write code in the sublanguage, based on the code written thus far, e.g., by detecting 804 a sublanguage delimiter and noting that what follows it is either empty, or is not compliant with the sublanguage's syntax and hence is likely an example rather than being sublanguage code. By-example sublanguage programming gives the programmer an option to provide examples that will indicate what the next code piece should be. Program synthesis creates multiple possible options for the next code piece by building upon the code the user has already written and the example(s) provided. Snippets may be ranked to show the most likely candidates for selection based on the user's programming context. Distinguishing examples 614 are generated for the synthesized code, and the enhanced system presents the code piece 210 along with distinguishing examples to aid comprehension of synthesized code. All this occurs in an IDE in real-time.

Real-time performance provides an important advantage, by facilitating usage of the presentation functionality 206, which in turn leads to other benefits such as improved code accuracy and increased programmer productivity. A technical challenge for providing real-time performance is addressed in part by picking the sublanguages and the triggers carefully. In particular, some embodiments favor small sublanguages, relative to the syntactic and semantic size of general-purpose languages. Some embodiments target specific parts in a sublanguage for automated synthesis, such as string constants used in that sublanguage. In particular, constant string descriptors used in datetime and regex libraries 414 are small enough in their syntax and semantics to permit real-time performance of synthesis and snippet presentation.

Additional Observations about Disambiguating Examples

Algorithm 1, shown in pseudocode form below, is an algorithm for synthesizing disambiguating examples.
function UnambiguousSynthesis(Examples)
    Programs gets Synthesize(Examples)
    PWUE gets empty set
    for all PrimaryProgram in Programs do
    SecondaryPrograms gets Programs minus Program
    PWUE[Program] gets DisambiguatingExample(Program,
        SecondaryPrograms, Examples)
    end for
    return PWUE
end function
function DisambiguatingExample(PrimaryProgram, SecondaryPrograms, Examples)
    UnambiguousExample gets empty
    repeat
    CandidateExample gets GenerateExamples(PrimaryProgram)
    NewPrograms gets Synthesize(CandidateExample)
    if PrimaryProgram is in NewPrograms, and SecondaryPrograms intersect NewPrograms is empty, then
        UnambiguousExample gets CandidateExample
    end if
    until UnambiguousExample is not empty
    return UnambiguousExample
end function
function GenerateExamples(Program)
    if IsAtomic(Program) then
    return ChooseRandom(AtomicExamples(Program))
    else
    SubPrograms gets Decompose(Program)
    SubExamples gets empty set
    for all SubProgram in SubPrograms do
        SubExamples[SubProgram] gets GenerateExamples(SubProgram)
    end for
    return Combine(SubExamples)
    end if
end function In this pseudocode, PWUE stands for programs with unambiguous examples. The algorithm may also be written using mathematical set notation, e.g., using established notations such as an arrow for assignment instead of writing "gets", using a zero with a slash through it for the empty set, using an upside-down capital T for bottom (which also means unassigned or empty), using a backslash symbol for set exclusion (also known as relative complement or set minus), using a stylized e for set membership (also pronounced "is a member of" or "element of"), and so on. The simpler typographic choices made in the pseudocode listing here are for convenience, and are not intended to restrict the formal meaning.

The function UnambiguousSynthesis( ) is a procedure which takes a set of user-provided examples and produces a set of programs which are consistent with the examples. Each program comes with an unambiguous example which distinguishes the program from all other programs.

The function DisambiguatingExample( ) is a procedure which takes a primary program, a set of other secondary programs from which the primary program is to be disambiguated, and the set of user-provided examples. It produces an unambiguous example such that (a) the unambiguous example is consistent with the primary program, and (b) the unambiguous example is not consistent with any program in the set of secondary programs. The function DisambiguatingExample( ) works by generating candidate examples for the primary program, and then synthesizing additional programs for the candidate example. If the set of additional programs contains the primary program, but does not contain any secondary programs, it is a disambiguating program.

The function GenerateExamples( ) is a procedure which takes as input a program, and produces a random example that is valid for the program. It does so by decomposing the program into subprograms, until an atomic program (one which cannot be decomposed further) is reached. For the atomic programs, the algorithm picks randomly an example from a predefined set of domain-specific examples. These smaller examples are then combined to produce the example for the whole program.

As further explanation for GenerateExamples( ), the following is offered. Procedure Synthesize( ) is a synthesis-by-example procedure that takes a set of examples and produces a set of programs that are consistent with it, it may be implemented, e.g., using Microsoft PROSE™ technology (mark of Microsoft Corporation). A domain-specific program decomposition is also used. For each program in the domain, a Decompose( ) function breaks the program up into subprograms. When a program cannot be decomposed further, it is an atomic program.

For example, for date-time formats, the format string (program) % H:% M:% S (representing [Hour]:[Minute]:[Second]) can be decomposed into: % H ([Hour]), constant program for the string consisting of a colon, % M ([Minute]), constant program for the string consisting of a colon, and % S ([Second]).

AtomicExamples are predefined domain-specific examples for the smallest components of programs in the domain. For example, an atomic program % A representing [WeekDay] will have AtomicExamples(WeekDay)={Monday, Tuesday, Wednesday, Thursday, Friday, Saturday, Sunday}.

Domain-specific example combination functions are also used. Given examples for the subprograms of a program, the Combine( ) function puts them together into a single example for the whole program. For instance, given the examples:
13 for % H [Hour],
:for the constant program:,
53 for % M [Minute],
:for the constant program:,
45 for % S [Second],
an implementation can combine them into 13:53:45 for the program % H:% M:% S.

Additional Scenarios

As an additional illustration, consider the following Python® source code which may be displayed in a user interface in an enhanced system, which begins by importing datetime and regular expression libraries and then gets the current date and time:
import datetime
import re
now=datetime.datetime.now( )
now.strftime("∥")

In the last line above, the cursor location is indicated by ∥. Instead of typing in a formatting snippet, the developer can type in an example: now.strftime("Thursday, Apr. 2 2020∥")

In response, this particular enhanced system 202 pops up a tooltip 322 displaying 910 text shown below, namely, a snippet 210 that matches the example given by the developer, and some in-the-interface guidance 218 in the form of an additional example 310 to aid developer confirmation that the synthesized snippet has the desired behavior:
now.strftime("Thursday, Apr. 2 2020∥")
  % A, % B % d % Y Like: Thursday, Dec. 31 2020

The developer can then accept the suggested snippet by pressing Enter, after which the cursor moves to the next line and the line receiving the snippet will read something like this:
now.strftime("% A, % B % d % Y") # "Thursday, Apr. 2 2020"
∥

Now consider a variation that involves ambiguity 612. Assume the developer types the following (T is a time delimiter):
now.strftime("2020-04-02T15:23")

In response, the enhanced system displays two possible snippets, because 04-02 could correspond to month and day or to day and month: now.strftime("2020-04-02T15:23")
  % Y-% d-% mT % H:% M Like: 2020-31-12T13:47
  % Y-% m-% dT % H:% M Then the developer clicks on the second snippet, because month followed by day is the desired format. Accordingly, the display changes to show something like this:
now.strftime("% Y-% m-% dT % H:% M") # "2020-04-02T15:23"

Snippet presentation may proceed in a similar way with regular expressions. For instance, a developer might type something like this: re.compile(Peter Pan, Jack Frost)

In response to the examples, the enhanced system might configure the user interface to show the following:
re.compile(Peter Pan, Jack Frost)
  r"^[A-Z][a-z]+[\s][A-Z][a-z]+$" Completion by example The developer can then accept the suggested snippet by pressing Enter, after which the receiving the snippet will read something like this: re.compile(r"^[A-Z][a-z]+[\s][A-Z][a-z]+$") # Peter Pan, Jack Frost Some embodiments use data mining or other techniques to influence snippet synthesis. For instance, consider a scenario involving HTML colors, which are often specified as hexadecimal numeric values. A develop might type something like the following (# indicates a hex value in this case):
re.compile("#ad34ff", "#93af00")

In response, the enhanced system may display something g like the following:
re.compile("#ad34ff", "#93af00")
  r"˄\#[0-9a-fA-F]{6}$" Completion by example Notice that the synthesized regular expression only includes characters a-f not a-z, because hex values do not include g-z. Also, even though the examples given used lowercase characters, the synthesized snippet allows uppercase characters A-F, since they are permitted in hex notation. These are benefits of some synthesizer technologies, including in particular some Microsoft PROSE™ synthesizers 208.

After the user accepts the snippet, the source will read:
re.compile(r"˄\#[0-9a-fA-F]{6}$") # #ad34ff", "#93af00

In another scenario, the display is configured by presentation functionality 206 with text such as the following:
import pendulum
now=pendulum.now( )
print("The time is { }".format(now.format("1972-05-21"))
  YYYY-MM-DD Examples
  1983-09-23
  2012-06-12
  Description
  YYYY-YEAR (2000, 2001, 2002)
  MM-MONTH (01, 02, . . . , 12)
  DD-DAY (01, 02, . . . , 31)

In the above scenario, activation of presentation functionality is type-directed; .format invokes the user experience. The developer directly types an example date string, and snippet suggestions are presented, as a form of provisional editing. Tooltip affordance functionality 910 is enhanced to provide additional examples and in-line help for the format specifiers.

In some scenarios, a tooltip or other UI mechanism displays documentation about the presentation functionality 206 itself. For instance, a user interface 214 may display text such as the following:
Start typing a date/time as you'd like it to
appear to get format string suggestions:
"10:15 PM", "Mar. 12, 2020", . . .

As further illustration, some embodiments provide functionality 206 that may be described as AI-assisted technology ("AI" being artificial intelligence), or as autocompletion-by-example support for snippets 210.

Shown below are some additional illustrative sublanguage snippets, which will be recognized as such by one of skill in view of the teachings provided herein:
r"(\d+)\.?(\d+)?"
"YYYY MM DD"
"% b % d % Y % H:% M:% S"
(2500).toLocaleString(
'en-US', {
  style: 'currency',
  currency: 'USD',
});
"% A %-d % t of % B % Y %:% M:% S % p"

Sublanguage snippets in some embodiments may also invoke or direct the computational system operation of each of the following library 414 functions: .to_atom_string( ), .to_cookie_string( ),to_s8601_string( ), .to_rfc822_string( ), to_rfc850_string( ), .to_rfc1036_string( ), .to_rfc1123_string( ), .to_rcf2822_string( ), .to_rfc3899_string( ), .to_rss_string( ), or .to_w3c_string( ).

Technical Character

The technical character of embodiments described herein will be apparent to one of ordinary skill in the art, and will also be apparent in several ways to a wide range of attentive readers. Some embodiments address technical activities such as detecting sublanguage delimiters 308 in computer program source code 216, communicating electronically 808, 810 between a software development tool 204 and a sublanguage code synthesizer 208, displaying 902 items in a user interface 214, and preserving 922 a copy of an example 310 in a source code 216, each of which is an activity deeply rooted in computing technology. Some of the technical mechanisms discussed include, e.g., a parser for delimiter detection 804, a sublanguage code snippet synthesizer 208, snippet ranking mechanisms 312, user interfaces 214 and particular GUI components such as tooltips 322, and snippet presentation software 304. Some of the technical effects discussed include, e.g., code snippets 210 which conform with desired examples 310 and whose accuracy is tested with respect to user-provided examples and automatically generated 936 examples, and improved software developer productivity by avoidance 818 of workflow 306 interruptions. Thus, purely mental processes are clearly excluded. Other advantages based on the technical characteristics of the teachings will also be apparent to one of skill from the description provided.

Some embodiments described herein may be viewed by some people in a broader context. For instance, concepts such as accuracy, clarity, comfort, creation, ease of use, ordering, or speed may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to efficiently and accurately place sublanguage code snippets in a surrounding program source code. Other configured storage media, systems, and processes involving accuracy, clarity, comfort, creation, ease of use, ordering, or speed are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, sublanguage or snippet examples, software processes, development tools, identifiers, sublanguage code guidance, code-by-example technologies, programming languages, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
TCP: transmission control protocol
TPU: tensor processing unit
UDP: user datagram protocol
UEFI: Unified Extensible Firmware Interface
URI: uniform resource identifier
URL: uniform resource locator
WAN: wide area network
Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers), or automatically generated or automatically synthesized.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

"Software development workflow" means steps or actions taken by or on behalf of a software developer during software code creation or modification or testing or debugging or profiling or deployment or monitoring.

A "programming language source code" is the source code in a general purpose programming language, e.g., C#, C++, Python, other imperative general purpose languages, or declarative languages, which excludes or extends beyond the sublanguages that have code synthesis functionality in a given situation.

A "source code" is code in human-readable text form in a programming language or sublanguage, with the understanding that code includes more than merely data values—code includes statements, expressions, identifiers, variable declarations, functions, etc. Code includes sublanguage snippets but excludes mere constants by themselves, e.g., a column or table of numbers.

A "sublanguage code snippet" is sublanguage code that PROSE™ or another code synthesizer synthesizes.

A "sublanguage code synthesizer" is PROSE™ or another code synthesizer (mark of Microsoft Corporation).

The adjective "autosynthesized" applies to sublanguage code, and means that the sublanguage code was or will be created automatically by a sublanguage code synthesizer based at least partially on one or more examples of a desired result of execution of the autosynthesized code.

A "sublanguage delimiter" is a syntactic marker indicating a location in programming language source code that contains or properly can contain sublanguage code. For instance, an opening double quote or other syntactic clue that sublanguage code comes next operates as a sublanguage delimiter in many programming languages.

A "user-provided example" is an example of sublanguage snippet execution output or another sublanguage snippet execution result, which a developer may type or paste into programming language source code.

The "execution" of a code implies compiling the code and running the compiled code, or interpreting the code; the distinction between compilers and interpreters is acknowledged herein but does not prevent beneficial application of the sublanguage snippet presentation teachings with either category of code.

Some examples of "sublanguage code guidance" include online developer forums, user manuals, code listings, and any other document that discusses or includes sublanguage syntax, sublanguage semantics, or an example of sublanguage code.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Sublanguage snippet presentation operations such as detecting 804 sublanguage delimiters in source code in an editor or IDE, receiving 806 examples through a user interface 214, electronic software-to-software communications 808, 810 between snippet presentation software 304 and a sublanguage code synthesizer 208, receiving 814 user selections 816 through a user interface, and many other operations discussed herein, are understood to be inherently digital. A human mind cannot interface directly with a CPU or other processor, or with RAM or other digital storage, to read and write the necessary data to perform the sublanguage snippet 210 presentation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as checking, detecting, displaying, executing, formatting, getting, matching, preserving, receiving, rendering, replacing, satisfying, selecting, sending, submitting, synthesizing, testing, using (and checks, checked, detects, detected, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., a software developer or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, identifier autocompletion software, simulators, fuzzers, repository access tools, version control tools, optimizers, collaboration tools, other software development tools and tool suites (including, e.g., integrated development environments), hardware development tools and tool suites, diagnostics, enhanced browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 (nodes 102) enhanced with sublanguage snippet presentation functionality 204 software development tool with functionality for editing source code, either interactively (contemplated as the most frequent scenario) or in a batch mode; some examples include IDEs and source code text editors 206 sublanguage snippet presentation functionality, e.g., functionality which does at least one of the following: communicates with a sublanguage snippet synthesizer 208, offers a sublanguage snippet to a developer in a user interface based on an example 310, conforms with the FIG. 9 flowchart or its constituent flowchart 800, or otherwise provides capabilities first taught herein 208 example-driven sublanguage code snippet synthesizer 210 sublanguage code snippet, e.g., sublanguage source code which upon execution produces a specified result 310

212 sublanguage; see the discussion herein of FIG. 4 and sublanguage aspects, as well as the snippets provided herein, which illustrate sublanguages 214 user interface, e.g., GUI or command line interface 216 source code; presumed to be in a programming language generally unless the context specifically indicates that the source code is sublanguage source code 218 sublanguage code guidance 302 interface between items in a computing system; interfaces include both hardware and software unless stated otherwise 304 sublanguage snippet presentation software 306 software development workflow 308 sublanguage delimiter; may also be referred to as "sublanguage code delimiter" or "snippet delimiter", for instance 310 example of desired output or value taken or other desired execution 908 result of executing a sublanguage snippet 312 snippet ranking mechanism; operates computationally in a system 202

314 snippet ranking (activity); also refers to snippet rank (result of ranking activity)

316 source code editor, e.g., an editor in an IDE, or a stand-alone editor 318 integrated development environment 320 performance criterion specifying acceptable performance level of at least a portion of sublanguage snippet presentation functionality 322 tooltip in a tool 204 GUI 214

402 date or time or both 404 formatted string; may be, e.g., a date or time string, an address string, a database query result in string form, a text search result, or another string having a specified format 406 regular expression; this is a term of art in the computing arts; regular expressions may be used, for instance, to perform or influence data selection, data production, data validation, or data manipulation 408 document object model (DOM)

410 cascading style sheet 412 cascading style sheet component; may be identified indirectly, e.g., a user may identify a website as an example rather than typing in the website content 414 software library, e.g., .dll, module, API, package, or other discrete reusable piece of software containing at least one routine 416 literal string; may also be referred to informally as a "string literal" or "string constant" or "constant string" or in some contexts simply as a "string"

418 larger program in which a sublanguage snippet is or will be placed; may also be referred to as "surrounding program" or "main program" or "primary program" for instance 420 programming language or sublanguage syntax; "syntax" is a term of art in the computing arts 422 programming language or sublanguage semantics; "semantics" is a term of art in the computing arts 424 pattern 426 sequence 428 data value 430 self-contained, as in capable of use on its own 432 programming language proper subset; a subset that uses a portion but not all of the syntax and semantics of a larger programming language 502 elapsed time 504 overlapping operations; when X and Y overlap, at least part of X occurs at the same time as at least part of Y; X may be contained chronologically entirely within Y but X and Y may also overlap when neither is contained entirely in the other 602 input; may refer to action of inputting or to item that is or was the subject of such action 604 output; may refer to action of outputting or to item that is or was the subject of such action 606 representative, e.g., particularly helpful as a compact illustration that indicates multiple similar items or values; 606 also refers to a representative example 608 range; a span or sequence of values 610 end value; first or last valid value in a range 612 ambiguity; e.g., an indication that more than one item is potentially present, without further assistance as to which item(s) is actually present 614 removal of an ambiguity; also referred to as "disambiguation"; 614 also refers to a disambiguating example; disambiguating examples are representative examples, but a representative example is not necessarily also disambiguating 616 enumeration value; a value in a set of non-numeric values, which may be ordered; e.g., {AM, PM}, {Mon, Tue, Wed, Thu, Fri, Sat, Sun}, {green, yellow, red} are each a set of enumeration values 702 location in source code, or on a display of source code, or both; may be indicated by a cursor or by a delimiter, for instance 704 editing functionality, e.g., software which performs text insertion, text deletion, text movement, in response to commands 706 autocompletion, e.g., an editing functionality which uses part or all of a typed identifier to compute and display a list of suggestions for completing the identifier 800 flowchart; 800 also refers to sublanguage snippet presentation methods illustrated by or consistent with the FIG. 8 flowchart 802 sublanguage snippet presentation generally 804 detect sublanguage delimiter in primary program source code; accomplished by computation; may include lexical analysis, parsing, and may be performed by code adapted from autocompletion or compilation, for instance 806 receive via a user interface one or more user-provided examples 310; accomplished by computation; corresponding send is implied; an example may be entered directly, e.g., through a user typing or pasting in the text of the example itself, or an example may be entered indirectly, e.g., through a user entering a file name, file path, URL, menu selection, or other identifier of one or more examples, such as when a enters a file name or other resource name and the file or other resource contains the example(s) 310 to be received 806

808 submit one or more user-provided examples 310 or autogenerated examples 310 to a sublanguage synthesizer 208; accomplished by computation; may involve procedure calls, APIs, network packets, shared memory, or other computational mechanisms 810 get one or more sublanguage snippets 210 from a sublanguage synthesizer 208; accomplished by computation; may involve procedure calls, APIs, network packets, shared memory, or other computational mechanisms 812 display one or more sublanguage snippets 210 in a user interface 214; accomplished by computation 814 receive selection 816 from a user, which identifies a subset of displayed snippets, either as desirable or as undesirable; accomplished by computation via a user interface 214

816 selection from a user identifying a subset of displayed snippets 818 avoiding reliance on sublanguage code guidance located outside an enhanced workflow 820 consult (e.g., read, query, or copy) sublanguage code guidance 822 display one or more examples 310 in a user interface 214; accomplished by computation 900 flowchart; 900 also refers to software development workflow methods illustrated by or consistent with the FIG. 9 flowchart (which incorporates the steps of FIG. 8)

902 display an item in a user interface 904 provide an autosynthesized snippet, e.g., by inserting it in main program source code 906 satisfy one or more performance criteria 320

908 execute a snippet 210 in a computing system 102

910 display an item (e.g., snippet 210, example 310, guidance 218) in a tooltip in a user interface 912 detect a string literal delimiter; this is a special case of detection 804

914 string literal delimiter; this is a special case of a sublanguage snippet delimiter 916 check whether an example 310 is ambiguous 918 avoid displaying 902 an item, e.g., avoid displaying an ambiguous example of snippet execution results 920 replace an example with a snippet in source code, e.g., modify the code 'print(x.strftime("6 Aug. 1991")) to read 'print(x.strftime("% d % b % Y"))'

922 preserve an example with a snippet in source code, e.g., modify 'print(x.strftime("6 Aug. 1991")) to 'print (x.strftime("% d % b % Y")) #6 Aug. 1991'

924 render a formatted string that states a date or time based on non-string type characters, e.g., integers that represent the date or time; performed by computation 926 test data against a regular expression; performed by computation 928 match a pattern in a sequence of data; performed by computation 930 select a cascading style sheet component; performed by computation 932 use as an example 310 a pair containing an input to a snippet and an output produced by executing the snippet with the input 934 a pair containing an input to a snippet and an output produced by executing the snippet with the input 936 generate an example 310; performed by computation 938 any step discussed in the present disclosure that has not been assigned some other reference numeral

CONCLUSION

In short, the teachings herein provide a variety of sublanguage code snippet presentation functionalities 206 which operate in enhanced systems 202. Accuracy and productivity of snippet 210 development within main programs are enhanced, with particular attention to sublanguages 212 such as those defined by date-time libraries 414, regular expressions 406, and DOM 408 search or manipulation.

In a computer program 120, 122, 124, 216, 418, sublanguage 212 code snippets 210 implement regular expressions 406, pattern 424 matching 926, 928, print formatting 404, 924, component 412 selection 930, and other operations 116, using sublanguage 212 syntax 420 and semantics 422 that are different from the source code 216 of a larger program 418 in which the snippets 210 are embedded. Writing snippets 210 that give desired execution results has been difficult and has interfered with software development workflow 306 when developers leave an editor 316 or an IDE 318 to go find sublanguage 212 coding guidance 218 in online forums, language manuals, other code bases, or the like.

But as taught herein, sublanguage 212 snippet 210 presentation 802 functionality 206 may be provided in an enhanced development tool 202, 204, which automatically detects 804 source code 216 locations 702 that are suitable for snippets 210, e.g., by lexical analysis and parsing that detects 912 string literal 416 delimiters 914 when the main program 418 treats a snippet 210 as a string literal 416. The enhanced tool 202, 204 receives 806 snippet 210 execution 908 result examples 310 from a developer 104 and displays 822 them as feedback, then submits 808 the examples 310 to synthesis-by-example technology 208, gets 810 autosynthesized snippets 210 that give those results 310, and displays 812 snippet 210 insertion candidates together with helpful guidance 218 inside the tool 202, 204. A snippet 210 that is then selected 816 by the developer 104 replaces 920 the example(s) 310 in the source code 216. In this manner, sublanguage 212 snippet 210 presentation functionality 206 improves developer productivity and program 418 execution accuracy with respect to documented test cases 310.

Examples 310 may be autogenerated 936, and may include representative examples 606, 310 or disambiguating examples 614, 310. Examples 310 may be preserved 922 in comments in the main program's 418 source code 216. Performance criteria 320 for sublanguage 212 snippet 210 presentation 802 are also described herein.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only, information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development system, comprising:
  a digital memory;
  an executable software development tool having a user interface; and
  a processor in operable communication with the digital memory, the processor configured to perform software development workflow steps for presentation of an autosynthesized sublanguage code snippet in the user interface, the software development workflow steps including:
  (a) detecting a sublanguage delimiter in a programming language source code that is displayed in the user interface,
  (b) receiving through the user interface as a user input a user-provided example, namely, an example from a user of a value taken or other result of a sublanguage code execution,
  (c) submitting the user-provided example to a sublanguage code synthesizer,
  (d) getting the autosynthesized sublanguage code snippet from the sublanguage code synthesizer, and
  (e) displaying the autosynthesized sublanguage code snippet in the user interface;
  whereby the system provides a software developer with autosynthesized sublanguage code which has an execution that produces the example entered by the developer, without requiring the developer to consult any sublanguage code guidance located outside the user interface.

2. The software development system of claim 1, wherein the user interface includes a tooltip, and the system displays the autosynthesized sublanguage code snippet in the user interface tooltip.

3. The software development system of claim 1, wherein the autosynthesized sublanguage code snippet comprises at least one of the following:
  sublanguage source code which upon execution renders a date or time in a formatted string;
  sublanguage source code which upon execution tests data against a regular expression;
  sublanguage source code which upon execution matches a pattern in a sequence of data values; or sublanguage source code which upon execution selects a cascading style sheet component.

4. The software development system of claim 1, wherein the software development system satisfies at least one of the following performance criteria:
- a time elapsed from finishing receiving the user-provided example to finishing displaying the autosynthesized sublanguage code snippet in the user interface is not more than two hundred and fifty milliseconds;
- a time elapsed from finishing receiving the user-provided example to finishing displaying the autosynthesized sublanguage code snippet in the user interface is less than an average time between consecutive keystrokes received in the user interface during the previous sixty seconds;
- the software development system displays the autosynthesized sublanguage code snippet in the user interface while the user-provided example is being received in the user interface;
- a time elapsed from beginning to receive the user-provided example to finishing displaying the autosynthesized sublanguage code snippet in the user interface is less than an average time over a past five identifier autocompletions, each identifier autocompletion including the tool recognizing a portion of an identifier which is being entered and displaying an identifier autocompletion list in the tool; or
- a time elapsed from finishing receiving the user-provided example to finishing displaying the autosynthesized sublanguage code snippet in the user interface is less than an average time for manual entry of a string which has the same length in characters as the autosynthesized sublanguage code snippet.

5. The software development system of claim 1, wherein the executable software development tool includes an integrated development environment.

6. The software development system of claim 1, wherein the software development system is further characterized by at least one of the following characterizations:
- multiple user-provided examples are received and submitted to the sublanguage code synthesizer as related examples, and the autosynthesized sublanguage code snippet which is gotten from the sublanguage code synthesizer outputs each example upon execution of a snippet with a corresponding input;
- multiple sublanguage code snippets are gotten from the sublanguage code synthesizer, the sublanguage code snippets are ranked relative to each other, and the multiple sublanguage code snippets are displayed together in the user interface in a ranked order; or
- the multiple sublanguage code snippets are gotten from the sublanguage code synthesizer and are displayed together in the user interface.

7. A software development workflow method, comprising:
- automatically detecting a sublanguage delimiter in a programming language source code that is displayed in a user interface of a software development tool, the user interface having source code editing functionality;
- receiving through the user interface as a user input a first user-provided example and displaying the first user-provided example at a display location which is indicated with the sublanguage delimiter, the first user-provided example including an example of a sublanguage code execution result;
- electronically submitting the first user-provided example to a sublanguage code synthesizer;
- electronically getting an autosynthesized sublanguage code snippet from the sublanguage code synthesizer; and
- displaying the autosynthesized sublanguage code snippet in the user interface at the display location in place of the first user-provided example;
- whereby the method provides a software developer with autosynthesized sublanguage code without requiring the developer to consult any sublanguage code guidance located outside the user interface's source code editing functionality.

8. The method of claim 7, further comprising displaying a second snippet execution result example which is producible by execution of the autosynthesized sublanguage code snippet.

9. The method of claim 8, wherein the second snippet execution result example is a representative example in at least one of the following ways:
- a second example removes an ambiguity that was left by the first user-provided example;
- the second example illustrates an end value of a range of values; or
- the second example illustrates an enumeration value that was not shown in the first user-provided example.

10. The method of claim 7, wherein detecting the sublanguage delimiter in the programming language source code includes detecting a string literal delimiter.

11. The method of claim 7, further comprising preserving a copy of the user-provided example at a location other than the display location and in association with the programming language source code and the autosynthesized sublanguage code snippet.

12. The method of claim 7, further comprising checking a candidate example for ambiguity by submitting the candidate example to the sublanguage code synthesizer, and then avoiding displaying the candidate example with the autosynthesized sublanguage code snippet if the sublanguage code synthesizer synthesizes more than one snippet based on the candidate example.

13. The method of claim 7, further comprising receiving through the user interface a first input example which corresponds to a first output example, and displaying the first input example together with the first output example at the display location which is indicated with the sublanguage delimiter.

14. The method of claim 7, wherein the method comprises receiving multiple user-provided examples, and the autosynthesized sublanguage code snippet includes source code which upon execution tests data against a regular expression.

15. The method of claim 7, wherein the method further comprises generating a disambiguating example, namely, an example which is in a first set of all outputs of the autosynthesized sublanguage code snippet and which is not in a second set of all outputs of a secondary snippet of sublanguage code.

16. A computer-readable storage medium configured with data and instructions which upon execution by a processor cause a computing system to perform a software development workflow method, the method comprising:
- receiving through a user interface of a software development tool a first user-provided example, the first user-provided example including an example of a sublanguage code execution result;
- displaying the first user-provided example in the user interface;

electronically submitting the first user-provided example to a sublanguage code synthesizer;

electronically getting an autosynthesized sublanguage code snippet from the sublanguage code synthesizer; and displaying the autosynthesized sublanguage code snippet in the user interface;

whereby the method provides a software developer with autosynthesized sublanguage code without requiring the developer to consult any sublanguage code guidance located outside the user interface.

17. The storage medium of claim 16, wherein a time elapsed from finishing receiving the first user-provided example to beginning displaying the autosynthesized sublanguage code snippet in the user interface is not more than one hundred milliseconds.

18. The storage medium of claim 16, wherein multiple autosynthesized sublanguage code snippets are gotten from the sublanguage code synthesizer and the method displays at least two of the multiple autosynthesized sublanguage code snippets together in the user interface, and the method further comprises receiving from a user a selection of one of the displayed autosynthesized sublanguage code snippets.

19. The storage medium of claim 16, wherein the method begins displaying the autosynthesized sublanguage code snippet in the user interface while the first user-provided example is being received in the user interface.

20. The storage medium of claim 16, wherein the method displays the autosynthesized sublanguage code snippet in the user interface while a programming language source code is displayed for editing in the user interface.

\* \* \* \* \*